US006287418B1

(12) United States Patent
Schroeder et al.

(10) Patent No.: US 6,287,418 B1
(45) Date of Patent: Sep. 11, 2001

(54) MODIFIED VINYL POLYMERS CONTAINING AMPHIPHILIC HYDROCARBON MOIETIES

(75) Inventors: Wen Zyo Schroeder, Appleton; Daniel Arthur Clarahan, Greenleaf; Mike Thomas Goulet; Thomas Gerard Shannon, both of Neenah, all of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/449,260

(22) Filed: Nov. 24, 1999

Related U.S. Application Data

(60) Provisional application No. 60/117,166, filed on Jan. 25, 1999.

(51) Int. Cl.$^7$ ........................................................ B31F 1/12
(52) U.S. Cl. ........................ 162/112; 162/111; 162/158; 162/164.1; 162/164.4; 162/168.1; 162/168.2; 162/168.3; 162/183
(58) Field of Search ..................................... 162/112, 111, 162/158, 164.1, 164.4, 168.1, 168.2, 168.3, 183

(56) References Cited

U.S. PATENT DOCUMENTS

| | | |
|---|---|---|
| 3,671,502 | 6/1972 | Samour et al. . |
| 4,728,696 | 3/1988 | Van Phung et al. . |
| 4,921,902 | 5/1990 | Evani et al. . |
| 5,177,165 | 1/1993 | Valint, Jr. et al. . |
| 5,320,711 | 6/1994 | Dauplaise et al. . |
| 5,507,914 | 4/1996 | Sarkar et al. . |
| 5,591,306 | 1/1997 | Kaun . |
| 5,651,861 | 7/1997 | Larson et al. . |
| 5,695,607 * | 12/1997 | Oriaran ................................. 162/112 |
| 5,723,022 | 3/1998 | Dauplaise et al. . |
| 5,746,887 | 5/1998 | Wendt et al. . |
| 5,772,845 | 6/1998 | Farrington, Jr. et al. . |
| 5,785,813 | 7/1998 | Smith et al. . |
| 5,789,516 | 8/1998 | Graiver et al. . |
| 5,852,095 | 12/1998 | Yamauchi et al. . |
| 5,874,495 | 2/1999 | Robinson . |
| 5,904,810 | 5/1999 | Schroeder et al. . |

FOREIGN PATENT DOCUMENTS

WO 98/45530
A1  10/1998  (WO) .

* cited by examiner

Primary Examiner—Stanley S. Silverman
Assistant Examiner—Mark Halpern
(74) Attorney, Agent, or Firm—Gregory E. Croft

(57) ABSTRACT

Synthetic polymers having moieties capable of covalent or hydrogen bonding to cellulose and one or more amphiphilic moieties are disclosed. These polymers are capable of providing two distinct properties to paper products, such as tissues, which properties heretofore have been imparted through the use of at least two different molecules. The backbone of these synthetic polymers is based on modified vinyl polymers, such as polyvinyl alcohol, polyacrylamides and polyacrylic acids.

88 Claims, No Drawings

MODIFIED VINYL POLYMERS CONTAINING AMPHIPHILIC HYDROCARBON MOIETIES

Figure 10:
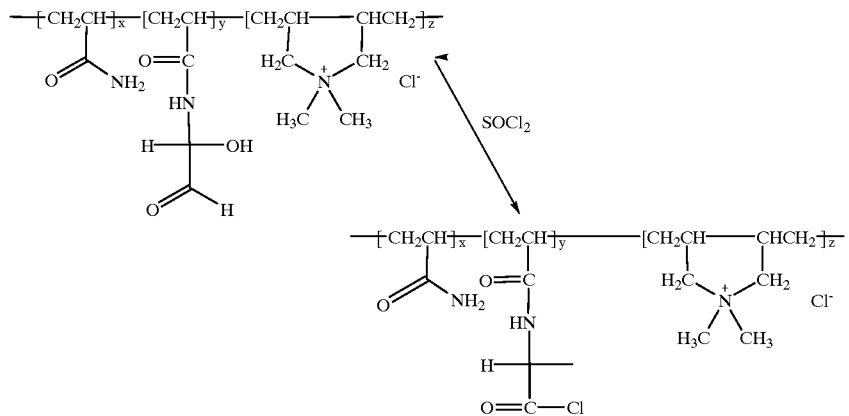

Provisional Application No. 60/117,166 filed Jan. 25, 1999.

BACKGROUND OF THE INVENTION

In the manufacture of paper products, such as facial tissue, bath tissue, paper towels, dinner napkins and the like, a wide variety of product properties are imparted to the final product through the use of chemical additives. Examples of such additives include softeners, debonders, wet strength agents, dry strength agents, sizing agents, opacifiers and the like. In many instances, more than one chemical additive is added to the product at some point in the manufacturing process. Unfortunately, there are instances where certain chemical additives may not be compatible with each other or may be detrimental to the efficiency of the papermaking process, such as can be the case with the effect of wet end chemicals on the downstream efficiency of creping adhesives. Another limitation, which is associated with wet end chemical addition, is the limited availability of adequate bonding sites on the papermaking fibers to which the chemicals can attach themselves. Under such circumstances, more than one chemical functionality compete for the limited available bonding sites, oftentimes resulting in the insufficient retention of one or both chemicals on the fibers.

Therefore, there is a need for a means of applying more than one chemical functionality to a paper web which mitigates the limitations created by limited number of bonding sites.

SUMMARY OF THE INVENTION

In certain instances, two or more chemical functionalities can be combined into a single molecule, such that the combined molecule imparts at least two distinct product properties to the final paper product that heretofore have been imparted through the use of two or more different molecules. More specifically, synthetic polymers, which are commonly used in the paper industry as dry strength resins, wet strength resins and retention aids, can be combined into a single molecule with amphiphilic hydrocarbons which are utilized in the paper industry as surface modifiers, release agents, antifoams, softeners, debonders and lubricants. The resulting molecule is a synthetic polymer having moieties capable of bonding to cellulose and amphiphilic hydrocarbon moieties which can provide several potential benefits, depending on the specific combination employed, including: strength aids that impart softness; softeners that do not reduce strength; wet strength with improved wet/dry strength ratio; surface feel modifiers with reduced Tinting and sloughing; strength aids with controlled absorbency; retention aids that soften; and improved retention of the amphiphilic hydrocarbon when added as a wet end additive.

The "synthetic polymers", as described herein, have a portion of their structure derived from the polymerization of ethylenically unsaturated compounds which contain pendant groups that can form hydrogen bonds, ionic bonds or covalent bonds with cellulose molecules in fibers, thereby increasing interfiber bonding. They include polyacrylamide, polyvinyl alcohol, polyacrylic acid, polymaleic anhydride, polymaleic acid, polyitaconic acid, cationic polyacrylamides, anionic polyacrylamides, and the like. The synthetic polymers as described herein may be water soluble, organic soluble or soluble in mixtures of water and water miscible organic compounds. Preferably they are water-soluble or water dispersible but this is not a necessity of the invention. Also included within the definition are the salts of the above mentioned acidic polymers. Substances which can be combined with the acidic portion of the polymers to make the salts include the alkali metals such as Potassium and Sodium usually added in formn of their hydroxides, the aliphatic amines and alkanol amines, such salts and methods of preparing such salts being well known to those skilled in the art.

Also as used herein, "amphiphilic hydrocarbon moieties" are organic compounds including alkanes, alkenes, alkynes, cyclic aliphatic and aromatic hydrocarbons that contain surface-active agents or are capable of acting as a surface active agent. The hydrocarbon portion of such materials may be linear or branched, saturated or unsaturated, substituted or unsubstituted.

Depending upon the chemical and the desired impact on the paper sheet, the synthetic polymers of this invention may be applied to the paper web by any of the means known to those skilled in the art Such means include wet end addition, spray addition on the wet web, as a creping chemical sprayed on the Yankee dryer, or as a post treatment addition, including spraying, printing or coating.

Hence in one aspect, the invention resides in a synthetic polymer having moieties capable of bonding to cellulose and containing one or more amphiphilic hydrocarbon moieties, said synthetic polymer having the following structure:

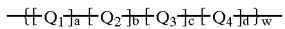

where:

a,b>0;

c,d$\geq$0 such that c+d>0;

w$\geq$1;

$Q_1$=a monomer unit or a block or graft copolymer containing a pendant group capable of forming hydrogen or covalent bonds with cellulose. Suitable pendant groups for hydrogen bonding are —$CONH_2$, —COOH, —$COO^-$ $M^+$, —OH and mixtures of said grouups. Preferred pendant group s for covalent bonding are aldehydes and anhydrides. $M^+$ can be any su itable counter ion including $Na^+$, $K^+$, $Ca^{+2}$ and the like.

$Q_2$=a block or graf t copolymer unit where the amphiphilic functionality is built in. It may be alkyl hydrocarbons with hydrophilic (such as —OH, ethoxy, and propoxy groups) functonality, or aliphatic hydrocarbons with hydrophilic functionality. The hydrocarbons could be linear or branched, saturated or unsaturated, substituted or unsubstituted, with 2 or more hydrocarbons. $Q_1$ may take the form of —$Z_1$—$Q_1$—$Z_1$— where $Z_1$ is any bridging radical whose purpose is to provide incorporation into the polymer backbone and $Q_1$ is as defined previously.

$Q_3$=a monomer unit or a block or graft copolymer containing a charge functionality. Such charge functionality is preferably cationic but may be anionic or amphoteric; and $Q_4$=a monomer unit or a block or graft copolymer containing a hydmphilic moiety, which is desirable for making the material into a form suitable for papendaking. $Q_4$ may take the form of —$Z_2$—$Q_4$—$Z_2$'— where $Z_2$, $Z_2$' are any bridging radicals, the same or different, whose purpose is to provide incorporation into the polymer backbone and $Q_4$ is as defined previously. $Q_4$ may be incorporated to offset the increased polymer hydrophobicity caused by i ntroduction of the amphiphilic hydrocarbon moieties. Examples of suitable o moieties are (but not limited to)

the aliphatic polyether derivatives of the formula —[(CR$_1$R$_2$)$_x$O]$_y$—R$_3$, wherein R$_1$,R$_2$ is H or CH$_3$, x≧2, y≧1 and R$_3$ is any suitable terminal group including —CH$_3$, —H, —C$_2$H$_5$, —NH$_2$.

It should be appreciated that when the Q$_3$ or other charged moiety is present in the synthetic polymer, that a suitable countedon Will be necessary. Such counterions may or may not be represented in the formulas. Where such counterions are not represented in the formula it should be understood that such an ion will exist The specific counteron is not critical for the invention, such counterion is only necessary for providing charge balance. For catonically charged groups the most common anions are those of the halides and alkyl sulfates. For anionically charged groups on the polymer the most common counter ions will be those of the alkali and alkaline earth metals as well as cationic ammonia and amine derivatives.

More specifically, the invention resides in a synthetic polymer having the following structure:

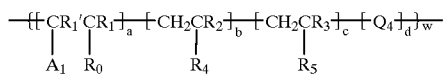

where:
w≧1;
R$_1$,R$_1$',R$_2$,R$_3$=H, C$_{1-4}$ alkyl;
a, b>0;
c,d ≧0 such that c+d >0;
Q$_4$=a monomer unit or a block or graft copolymer containing a hydrophilic moiety, which is desirable for making the material into a form suitable for papermaking. Q$_4$ may take the form of —Z$_2$—Q$_4$—Z$_2$'— where Z$_2$, Z$_2$' are any bridging radicals, the same or different, whose purpose is to provide incorporation into the polymer backbone and Q$_4$ is as defined previously. Q$_4$ may be incorporated to offset the increased polymer hydrophobicity caused by introduction of the amphiphilic moieties.
R$_0$=any group capable of forming hydrogen or covalent bonds with cellulose. Preferred are —CONH$_2$, —COOH, COO$^-$M$^+$,—OH, —CONHCHOHCHO and mixtures of said groups;
A$_1$=—H, —COOH;
R$_4$=Z—R$_6$ radical where:
Z=aryl, —CH$_2$—, —COO—, —CONR'—, —O—, —S—, —OSO$_2$O—, —CONHCO—,—CONHCHOHCHOO— or any other radical capable of bridging the R$_6$ group to the vinyl backbone portion of the molecule. (R' =H, alkyl);
R$_6$=an amphiphilic hydrocarbon; It may be an alkyl hydrocarbon radical with hydrophilic functionality such as —OH, or ethoxy or propoxy groups, or an aliphatic hydrocarbon radical with hydrophilic functionality. The hydrocarbons can be linear or branched, saturated or unsaturated, substituted or unsubstituted, with 2 or more hydrocarbons.
R$_5$=Z$_2$—R$_{10}$—W;
Z$_2$=aryl, —CH$_2$—, —COO—, —CONH—, —O—, —S—, —OSO$_2$O—, any radical capable of bridging the R$_{10}$ group to the vinyl backbone portion of the molecule;
R$_{10}$=any linear or branched, aliphatic or aromatic hydrocarbon of 2 or more carbons, preferably —(CH$_2$CH$_2$)—, —C(CH$_3$)$_2$CH$_2$CH$_2$—; and
W=—N$^+$R$_{11}$,R$_{12}$,R$_{13}$ where R$_{11}$,R$_{12}$,R$_{,13}$ is a C$_{1-4}$ alkyl group.
—[CH$_2$CR$_3$R$_5$]$_c$- may also be the residue formed by co-polymerization with dimethyidiallyl ammonium chloride. In this case the charge-containing residue [CH$_2$CR$_3$R$_5$]$_c$- will be the form of monomers with repeat units of structure:

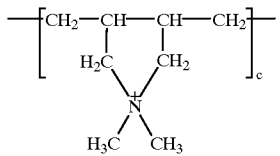

In another aspect, the invention resides in a paper sheet, such as a tissue sheet, comprising a synthetic polymer having moieties capable of bonding to cellulose and containing an amphiphilic hydrocarbon moiety, said polymer having the following structure:

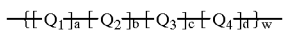

where:
a, b>0;
c,d ≧0 such that c+d >0;
w≧1;
Q$_1$=a monomer unit or a block or graft copolymer containing a pendant group capable of forming hydrogen or covalent bonds with cellulose. Preferred pendant groups for hydrogen bonding are —CONH$_2$, —COOH, —COO$^-$M$^+$, —OH and mixtures of said groups. Preferred pendant groups for covalent bonding are aldehydes and anhydrides. M$^+$ can be any suitable counter ion including Na$^+$, K$^+$, Ca$^{+2}$ and the like.
Q$_2$=a block or graft copolymer unit where the amphiphilic functionality is built in. It may be alkyl hydrocarbons with hydrophilic (such as —OH, ethoxy and propoxy groups) functionality, or aliphatic hydrocarbons with hydrophilic functionality. The hydrocarbons could be linear or branched, saturated or unsaturated, substituted or unsubsfituted, with 2 or more hydrocarbons. Q$_1$ may take the form of —Z$_1$—Q$_1$—Z$_1$— where Z$_1$ is any bridging radical whose purpose is to provide incorporation into the polymer backbone and Q$_1$ is as defined previously. Q$_3$=a monomer unit or a block or graft copolymer containing a charge functionality. Such charge functionality is preferably cationic but may be anionic or amphoteric; and
Q$_4$=a monomer unit or a block or graft copolymer containing a hydrophilic moiety, which is desirable for making the material into a form suitable for papermaking. Q$_4$ may take the form of —Z$_2$—Q$_4$—Z$_2$'— where Z$_2$, Z$_2$' are any bridging radicals, the same or different, whose purpose is to provide incorporation into the polymer backbone and Q$_4$ is as defined previously. Q$_4$ may be incorporated to offset the increased polymer hydrophobicity caused by introduction of the amphiphilic hydrocarbon moieties. Examples of suitable Q$_4$ moieties are (but not limited to) the aliphatic polyether derivatives of the formula —[(CR$_1$R$_2$)$_x$O]$_y$—R$_3$, wherein R$_1$,R$_2$ is H or CH$_3$, x≧2, y≧1 and R$_3$ is any suitable terminal group including —CH$_3$, —H, —C$_2$H$_5$, —NH$_2$.

More specifically, the invention resides in a paper sheet, such as a tissue sheet, comprising a synthetic polymer having hydrogen bonding capability and containing an amphiphilic hydrocarbon moiety, said polymer having the following structure:

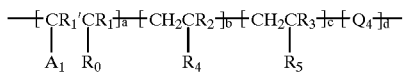

where:

$w \geq 1$;

$R_1, R_1', R_2, R_3 = H$, $C_{1-4}$ alkyl;

$a, b > 0$;

$c, d >, = 0$;

$Q_4$=a monomer unit or a block or graft copolymer containing a hydrophilic moiety, which is desirable for making the material into a form suitable for papermaking. $Q_4$ may take the form of $-Z_2-Q_4-Z_2'-$ where $Z_2, Z_2'$ are any bridging radicals, the same or different, whose purpose is to provide incorporation into the polymer backbone and $Q_4$ is as defined previously. $Q_4$ may be incorporated to offset the increased polymer hydrophobicity caused by introduction of the amphiphilic moieties. Examples of suitable $Q_4$ moieties are (but is not limited to) the aliphatic polyether derivatives of the formula $-[(CR_1R_2)_xO]_y-R_3$, wherein $R_1, R_2$ is H or $CH_3$, $x \geq 2$, $y \geq 1$ and $R_3$ is any suitable terminal group including $-CH_3$, $-H$, $-C_2H_5$, $-NH_2$;

$R_0$=any group capable of forming hydrogen or covalent bonds with cellulose. Suitable groups are $-CONH_2$, $-COOH$, $COO^-M^+$, $-OH$, $-CONHCHOHCHO$, and anhydride including mixtures of said groups;

$A_1$=H, COOH;

$R_4 = Z - R_6$ radical where:

Z=aryl, $-CH_2-$, $-COO-$, $-CONR'-$, $-O-$, $-S-$, $-OSO_2O-$, $-CONHCO-$, $-CONHCHOHCHOO-$ or any radical capable of bridging the $R_6$ group to the vinyl backbone portion of the molecule. ($R'=-H$, alkyl);

$R_6$=an amphiphilic hydrocarbon radical; It may be an alkyl hydrocarbon radical with hydrophilic functionality such as $-OH$, or ethoxy or propoxy groups, or an aliphatic hydrocarbon radical with hydrophilic functionality. The hydrocarbons can be linear or branched, saturated or unsaturated, substituted or unsubstituted, with 2 or more hydrocarbons.

$R_5 = Z_2 - R_{10} - W$;

$Z_2$=aryl, $-CH_2$, $-COO-$, $-CONH-$, $-O-$, $-S-$, $-OSO_2O-$ or any radical capable of bridging the $R_{10}$ group to the vinyl backbone portion of the molecule;

$R_{10}$=any linear or branched, aliphatic or aromatic hydrocarbon of 2 or more carbons, preferably $-(CH_2CH_2)-$, $-C(CH_3)_2CH_2CH_2-$; and $W = -N^+R_{11}, R_{12}, R_{13}$ where $R_{11}, R_{12}, R_{13}$ is a $C_{1-4}$ alkyl group.

$-[CH_2CR_3R_5]_c-$ may also be the residue formed by co-polymerization with dimethyidiallyl ammonium chloride. In this case the charge-containing residue $[CH_2CR_3R_5]-$ will be the form of monomers with repeat units of structure:

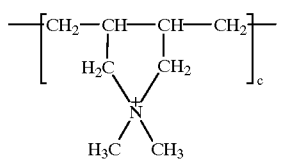

In another aspect, the invention resides in a method of making a paper sheet, such as a tissue sheet, comprising the steps of. (a) forming an aqueous suspension of papermaking fibers; (b) depositing the aqueous suspension of papermaking fibers onto a forming fabric to form a web; and (c) dewatering and drying the web to form a paper sheet, wherein a synthetic polymeric additive is added to the aqueous suspension of fibers or to the web, said polymeric additive having the following structure:

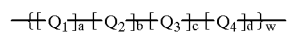

where:

a, b>0;

$c, d \geq 0$ such that c+d >0;

$w \geq 1$;

$Q_1$=a monomer unit or a block or graft copolymer containing a pendant group capable of forming hydrogen or covalent bonds with cellulose. Preferred pendant groups for hydrogen bonding are $-CONH_2$, $-COOH$, $-COO^-M^+$, $-OH$ and mixtures of said groups. Preferred pendant groups for covalent bonding are aldehydes and anhydrides. $M^+$ can be any suitable counter ion including $Na^+$, $K^+$, $Ca^{+2}$ and the like.

$Q_2$=a block or graft copolymer unit where the amphiphilic functionality is built in. It may be alkyl hydrocarbons with hydrophilic (such as $-OH$, or ethoxy groups) functionality, or aliphatic hydrocarbons with hydrophilic functionality. The hydrocarbons could be linear or branched, saturated or unsaturated, substituted or unsubstituted, with 2 or more hydrocarbons. $Q_1$ may take the form of $-Z_1-Q_1-Z_1-$ where $Z_1$ is any bridging radical whose purpose is to provide incorporation into the polymer backbone and $Q_1$ is as defined previously.

$Q_3$=a monomer unit or a block or graft copolymer containing a charge functionality. Such charge functionality is preferably cationic but may be anionic or amphoteric; and $Q_4$=a monomer unit or a block or graft copolymer containing a hydrophilic moiety, which is desirable for making the material into a form suitable for papermaking. $Q_4$ may take the form of $-Z_2-Q_4-Z_2'-$ where $Z_2, Z_2'$ are any bridging radicals, the same or different, whose purpose is to provide incorporation into the polymer backbone and $Q_4$ is as defined previously. $Q_4$ may be incorporated to offset the increased polymer hydrophobicity caused by introduction of the amphiphilic hydrocarbon moieties. Examples of suitable $Q_4$ moieties are (but not limited to) the aliphatic polyether derivatives of the formula $-[(CR_1R_2)_xO]_y-R_3$, wherein $R_1, R_2$ is H or $CH_3$, $x \geq 2$, $y \geq 1$ and $R_3$ is any suitable terminal group including $-CH_3$, $-H$, $-C_2H_5$, $-NH_2$.

More specifically, the invention resides in a method of making a paper sheet, such as a tissue sheet, comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymeric additive is added to the aqueous suspension of fibers or to the web, said polymeric additive having the following structure:

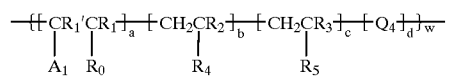

where:

$w \geq 1$;

$R_1, R_1', R_2, R_3 = H$, $C_{1-4}$ alkyl;

a,b>0;
c,d ≧0;
$Q_4$=a monomer unit or a block or graft copolymer containing a hydrophilic moiety, which is desirable for making the material into a form suitable for papermaking. $Q_4$ may take the form of —$Z_2$—$Q_4$—$Z_2$'— where $Z_2$, $Z_2$' are any bridging radicals, the same or different, whose purpose is to provide incorporation into the polymer backbone and $Q_4$ is as defined previously. $Q_4$ may be incorporated to offset the increased polymer hydrophobicity caused by introduction of the amphiphilic hydrocarbon moieties. Examples of suitable $Q_4$ moieties are (but is not limited to) the aliphatic polyether derivatives of the formula —$[(CR_1R_2)_xO]_y$—$R_3$, wherein $R_1,R_2$ is H or $CH_3$, x≧2, y≧1 and $R_3$ is any suitable terminal group including —$CH_3$, —H, —$C_2H_5$, —$NH_2$;

$R_0$=any group capable of forming hydrogen or covalent bonds with cellulose. Preferred are —$CONH_2$, COOH, $COO^-$, —OH, CONHCHOHCHO, and anhydride including mixtures of said groups;

$A_1$=—H, —COOH;

$R_4$=Z—$R_6$ radical where:
Z=aryl, —$CH_2$—, —COO—, —CONR'—, —O—, —S—, —$OSO_2O$—, —CONHCO—, —CONHCHOHCHOO— or any radical capable of bridging the $R_6$ group to the vinyl backbone portion of the molecule. (R'=H, alkyl);

$R_6$=an amphiphilic hydrocarbon radical; It may be an alkyl hydrocarbon radical with hydrophilic functionality such as —OH, or ethoxy or propoxy groups, or an aliphatic hydrocarbon radical with hydrophilic functionality. The hydrocarbons can be linear or branched, saturated or unsaturated, substituted or unsubstituted, with 2 or more hydrocarbons.

$R_5$=$Z_2$—$R_{10}$—W;
$Z_2$=aryl, —$CH_2$—, —COO—, —CONH—, —O—, —S—, —$OSO_2O$— or any radical capable of bridging the $R_{10}$ group to the vinyl backbone portion of the molecule;

$R_{10}$=any linear or branched, aliphatic or aromatic hydrocarbon of 2 or more carbons, —preferably —($CH_2CH_2$)—, —$C(CH_3)_2CH_2CH_2$—; and W=—$N^+R_{11},R_{12},R_{13}$ where $R_{11},R_{12},R_{13}$ is a $C_{1-4}$ alkyl group.

—$[CH_2CR_3R_5]_c$- may also be the residue formed by co-polymerization with dimethyldiallyl ammonium chloride. In this case the charge-containing residue $[CH_2CR_3R_5]_c$- will be the form of monomers with repeat units of structure:

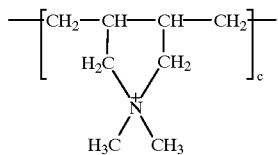

The amount of the modified vinyl polymer containing amphiphilic hydrocarbon moieties added to the papermaking fibers can be from about 0.02 to about 4 weight percent, on a dry fiber basis, more specifically from about 0.05 to about 3 weight percent, and still more specifically from about 0.1 to about 2 weight percent. The modified vinyl polymer can be added to the fibers at any point in the process where the fibers are suspended in water.

Methods of making paper products that can benefit from the various aspects of this invention are well known to those skilled in the papermaking art. Exemplary patents include U.S. Pat. No. 5,785,813 issued Jul. 28,1998 to Smith et al. entitled "Method of Treating a Papermaking Furnish For Making Soft Tissue"; U.S. Pat. No. 5,772,845 issued Jun. 30, 1998 to Farrington, Jr. et al. entitled "Soft Tissue"; U.S. Pat. No. 5,746,887 issued May 5, 1998 to Wendt et al. entitled "Method of Making Soft Tissue Products"; and U.S. Pat. No. 5,591,306 issued Jan. 7,1997 to Kaun entitled "Method For Making Soft Tissue Using Cationic Silicones", all of which are hereby incorporated by reference.

DETAILED DESCRIPTION OF THE INVENTION

To further describe the invention, examples of the synthesis of some of the various chemical species are given below.

Vinyl Polymers

First with regard to the modified vinyl polymers, they can be made via free radical polymerization of vinyl monomers of the form:

$$R_1R_2C\!\!=\!\!CR_3R_4$$

where $R_1,R_2,R_3,R_4$ may be H, halogen, alkyl, functional alkyl, aryl, functional aryl. For papermaking the polyacrylamides ($R_4$=—$CONH_2$), polyvinyl alcohols ($R_4$=—OH), and polyacrylates ($R_4$=COOR', R'=H, Me) are the most widely used.

Of the modified vinyl polymers, polyacrylamides (PAM) are used as dry strength additives in addition to their widespread use as drainage and retention aids. They are water soluble polymers containing primary amide groups that can form hydrogen bonds with cellulose molecules in fibers thereby increasing interfiber bonding. They are synthesized by the free radical polymerization or photoinitated polymerization of acrylamide as shown in FIG. 1. Any free radical initiator or photoinitiator may be used. The polymerization may be done via a variety of procedures including solution, bulk, suspension and emulsion polymerizations.

FIG. 1

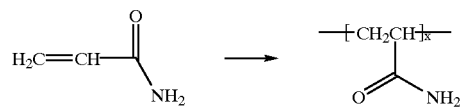

PAMs are nonionic materials and have very little attraction to papermaking fibers. Therefore it is necessary to incorporate charged groups into the polymer structure to make it useful for papermaking. Both anionic and cationic polyacrylamides are known in the art.

Anionic polyacrylamides can be produced by: (1) copolymerization of acrylamide with acrylic acid; and (2) hydrolysis of some of the amide groups on the polyacrylamide chain. The resultant polymer will contain a mixture of acrylamide and acrylic acid groups. Anionic polyacrylamides were first produced in the 1950's via copolymerization of acrylamide with acrylic acid. The acrylic acid groups introduce an ionizable carboxyl group on the polymer backbone. Ionization of these carboxyl groups is highly pH dependent where above pH 7 essentially 100% of the carboxyl groups are ionized. Since anionic polyacrylamides are negatively charged they are not directly attracted to the like charged cellulose fibers. A cationic substance such as alum must be used in conjunction with them to promote their retention.

To avoid the need for a cationic promoter, another approach is to incorporate cationic groups directly into the polymer backbone. Having been commercially produced since the late 1960's these cationically charged polyacrylamides are the most common form of dry strength PAM's. Cationic polyacrylamides are produced by copolymerization of acrylamide with cationic monomers or by modification of some of the amide groups. A typical reaction is illustrated in FIG. 2 for copolymerization with Methacryuloyloxyethyl trimethyl ammonium methosulfate (METAMS). Typical cationic monomers include: (1) methacryuloyloxyethyl trimethyl ammonium methosulfate; (2) dimethyidiallyl ammonium chloride (DMDMC); (3) 3-acryloamido-3-methyl butyl trimethyl ammonium chloride (AMBTAC); (4) trimethylamino methacrylate; and (5) vinyl benzyl trimethyl ammonium chloride (VBTAC). Such materials have structures similar to that shown in FIG. 2 for METAMS copolymerized cationic PAM.

When used as dry strength additives usually around 5–10 mole % of the monomers will contain charged groups. Unlike the anionic PAM's, cationic PAM's are effectively charged across the entire pH range. Typical molecular weights for cationic PAM dry strength aids are in the range of 10,000 to 500,000. The molecular weight is important so as to be low enough to not bridge between particles and cause flocculation, and yet high enough to retard migration of the polymer into the pores of the fibers. Such migration would cause a reduction in dry strength activity.

When used as retention aids a broader range of molecular weights and charge densities may be employed. Key characteristics of polyacrylamide retention aids include the molecular weight, the type of charge, the charge density and the delivery form. For the average molecular weight, the range can be: low (1,000–100,000); medium (100,000–1,

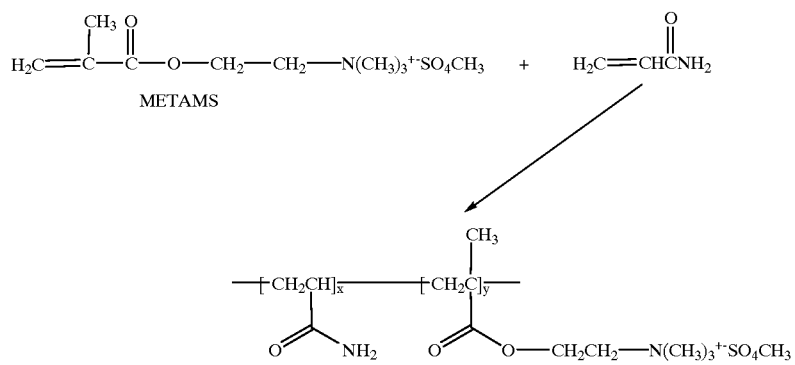

FIG. 2

The incorporation of cationic groups through modification of non-ionic polyacrylamide is most often accomplished via the Mannich reaction as illustrated in FIG. 3. Generally cationic polyacrylamides will contain from about 5 to about 70% mole percent cationic groups.

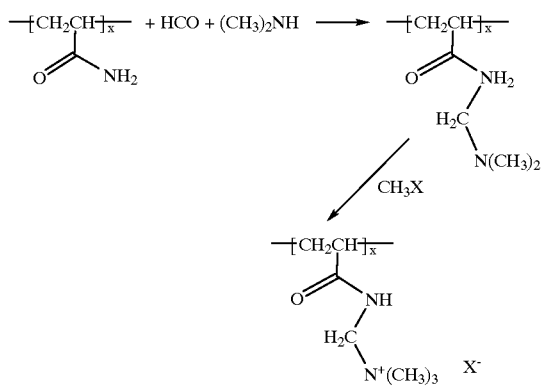

FIG. 3

Generally dry strength PAMs are supplied as ready to use aqueous solutions or as water-soluble powders which must be dissolved prior to use. They may be added to thin or thick stock at a point of good mixing for best results. Addition rates of 0.1% to 0.5% of dry fiber typically give best results. High addition rates may cause overcationization of the furnish and reduce the effectiveness of other additives.

000,000); high (1,000,000–5,000,000); very high (>5,000,000). The charge type can be nonionic, cationic, anionic or amphoteric. The charge density can be: low (1–10%); medium (10–40%); high (40–80%); or very high (80–100%). The delivery form can be either an emulsion, an aqueous solution or a dry solid.

High molecular weight/low charge density flocculants are used most often for retention of fine particles in high shear and turbulence environments. Low molecular weight/high charge density products are used for their charge modifying capabilities and for retention in low shear environments.

A second class of charged polyacrylamides that has found widespread use in tissue and papermaking is the so-called "glyoxylated" polyacrylamides. Coscia, et al., U.S. Pat. No. 3,556,932 assigned to the American Cyanamid Company, describes the preparation and properties of glyoxylated polyacrylamides in detail. These polymers are ionic or nonionic water-soluble polyvinyl amides, having sufficient glyoxal substituents to be thermosetting. Where a cationic charge is employed, the amount of cationic component in the polymers should be sufficient to render the polymer substantive to cellulose fibers in aqueous suspensions. The amount of cationic charge in these polymers may vary. It may be less than 10 mole percent or as high as around 50 mole percent. Indeed many commercial versions are sold with a charge density of around 5 mole percent. Incorporation of the charge onto the polymer backbone can be accomplished through any of the methods known in the art. A preferred approach is to incorporate a cationic vinyl monomer with the acrylamide or other vinyl monomers during the polymerization of the base polymer. As with the nonglyoxylated polyacrylamides, the specific monomer used to introduce the cationic charge onto the polyacrylamide is not overly critical and may be chosen from any such monomers known to be capable of incorporating a cationic charge into a polyacrylamide backbone. Dimethyldiallyl ammonium chloride is an especially preferred monomer for introducing the cationic charge. Where substantivity to cellulose fibers in aqueous solution is not required the cationic charge moiety may be absent from the polymer backbone. Anionic versions of the polymers may be easily prepared from the appropriate raw materials, these anionic polymers capable of being deposited on fibers with use of alum or various cationic retention aids.

The minimum amount of pendant amide groups that need to be reacted with the glyoxal for the polymer to be thermosetting is around two mole percent of the total number of available amide groups. It is usually preferred to have an even higher degree of reaction so as to promote greater wet strength development, although above a certain level additional glyoxal provides only minimal wet strength improvement. The optimal ratio of glyoxylated to non-glyoxylated acrylamide groups is around 10 to 20 mole percent of the total number of amide reactive groups available on the parent polymer. The reaction can be easily carried out in dilute solution by stirring the glyoxal with the polyacrylamide base polymer at temperatures of about 25° C. to 100° C. at a neutral or slightly alkaline pH. Generally the reaction is run until a slight increase in viscosity is noted. The majority of the glyoxal reacts at only one of its functionalities yielding the desired aldehyde functional acrylamide.

The molecular weight of the acrylamide base polymer is not overly critical to the ability to react with glyoxal and generally polymers of molecular weight less than two million are adequately water soluble and dilutable so as not to not severely hinder reaction capability. In practice, lower molecular weight polymers having a molecular weight less than 25,000 are generally preferred due to their lower solution viscosity and ease at which they can be diluted in water. Molecular weight and degree of glyoxylation, however, can have an impact on level of wet strength development and ability to disperse readily in water. It might be expected that certain performance characteristics could be tailored by blending polymers of different molecular weights and substitution levels. For examples Dauplaise, et al., U.S. Pat. No. 5,723,022 discloses the unique performance gained by mixing low and high Mw acrylamides having different levels of glyoxylation. Glyoxylated polyacrylamides are generally delivered as dilute aqueous solutions having a solids content of 10% or less. More highly concentrated solutions can be prepared but the risk of gel formation occurs as the solids content is increased. Shelf life is also reduced at elevated temperatures.

A structure for a typical cationic glyoxylated polyacrylamide is shown in FIG. 4. The polymer is retained on the fiber by means of the cationic quaternary amine group that is attracted to anionic sites on the cellulose. In terms of chemical reactivity, only the amide and aldehyde functionalities are reactive. Approximately 2–30 mol % of the entire glyoxylated PAM copolymer exists as the active aldehyde group. The pendant amide groups on this polymer form hydrogen bonds with cellulose increasing the dry strength of the sheet. The aldehyde group can either crosslink with an amide group in another part of the polymer or react with a hydroxyl group on cellulose fibers.

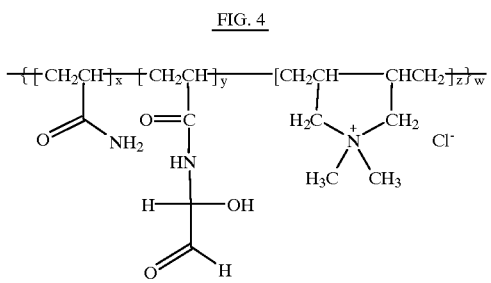

FIG. 4 where:
$w \geq 1$
$x,y,z \geq 1$

If the aldehyde links with the amide a permanent covalent cross-link is formed which increases permanent wet strength. If the aldehyde forms a covalent hemi-acetal bond to the cellulose, wet strength is also increased. However, this bond is not permanent and will break when immersed in water resulting in temporary instead of permanent wet strength. Hence, Parez is normally used to increase dry strength and temporary wet strength, such as is desired for bath tissue.

Glyoxylated polyacrylamides have many beneficial properties. They increase both the wet and dry strength of the paper. Though slightly acidic conditions are preferred, they thermoset or "cure" at pH's in the approximate range of 4–8 and moderately elevated temperatures that are common to most papermaking systems. Since they can be cured over a broad pH range including neutral pH, precise control of pH is not required in the paper making system. The polymers develop the large majority of their wet and dry strength wile passing through the drying section of the paper process with sheet temperatures as low as 70° F. to 90° F. being adequate. An additional advantage to the glyoxylated polyacrylamides is that they possess what is referred to as "temporary wet strength". A portion of the wet strength developed within the paper web is lost when soaked in water for a moderate period of time. This feature allows use of these materials in products such as bath tissue where water break-up is a required product attribute. In addition all of the wet strength can be lost rapidly under alkaline conditions. This makes these materials very amenable to broke repulping operations not requiring additional chemicals or processes which add to overall paper manufacturing costs.

Amphiphilic Hydrocarbon Moieties

Amphiphilic hydrocarbon moieties are a group of surface active agents (surfactants) capable of modifying the interface between phases. Surfactants are widely used by the industry for cleaning (detergency), solubilizing, dispersing, suspending, emulsifying, wetting and foam control. In the papermaking industry, they are often used for deinking, dispersing and foam control. They have an amphiphilic molecular structure containing at least one hydrophilic (polar) region and at least one lipophilic (non-polar, hydrophobic) region within the same molecule. When placed in a given interface, the hydrophilic end leans toward the polar phase while the lipophilic end orients itself toward the non-polar phase.

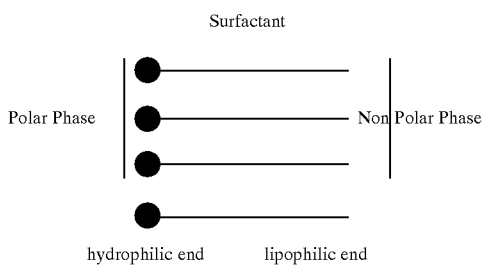

The hydrophilic end can be added to a hydrophobe synthetically to create the amphiphilic molecular structure. FIG. 5 shows a possible schematic pathway for making a variety of surfactants:

FIG. 5

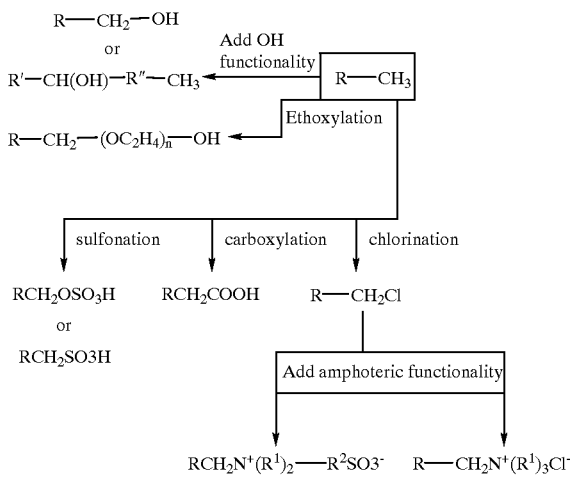

Based on the charge, surfactants can be grouped as amphoteric, anionic, cationic and nonionic.

First with regard to the amphoteric surfactants, the charges on the hydrophilic end change with the environmental pH: positive in acidic pH, negative at high pH and become zwitterions at the imtermediate pH. Surfactants included in this category include alkylamido alkyl amines and alkyl substituted amino acids.

Structure commonly shared by alkylamido alkyl amines:

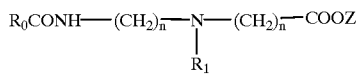

where:
$R_0$=a $C_4$ or higher alkyl or aliphatic hydrocarbon, normal or branched, saturated or unsaturated, substituted or unsubstituted;
$n \geq 2$;
$R_1$=hydroxy or carboxy ended alkyl or hydroxyalkyl groups, C chain$\geq$2C, with or without ethoxylation, propoxylation or other substitution; and
Z=H or other cationic counterion.

Structure shared commonly by alkyl substituted amino acids:

where:

$R_1$=alkyl or aliphatic hydrocarbon, normal or branched, saturated or unsaturated, substituted or unsubstituted, C chain$\geq$4C;
$n \geq 2$;
Z=H or other cationic counterion; and
R'=carboxylic end of the amino acid.

With regard to the anionics, the hydrophilic end of the surfactant molecule is negatively charged. Anionics consist of five major chemical structures: acylated amino acids/acyl peptides, carboxylic acids and salts, sulfonic acid derivatives, sulfuric acid derivatives and phosphoric acid derivatives. The structure commonly shared by acylated amino acids and acyl peptides is shown as follows:

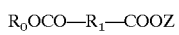

or

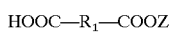

where:
$R_0$=alkyl or aliphatic hydrocarbon, normal or branched, saturated or unsaturated, substituted or unsubstituted, C chain$\geq$4C;
$R_1$=alkyl substituted amino acid moiety; or —NH—CHX—CO$)_n$—NH—CHX—
where $n \geq 1$, X=amino acid sidechain; or alkyl —NHCOR' where R'=aliphatic hydrocarbon, normal or branched, saturated or unsaturated, substituted or unsubstituted, C chain$\geq$4C; and
Z=H or other cationic counterion.

The structure commonly shared by carboxylic acid and salts is shown as follows:

where:
R=alkyl or aliphatic hydrocarbon, normal or branched, saturated or unsaturated, substituted or unsubstituted, with or without esterification, with or without etherification, C chain$\geq$4C; and
Z=H or other cationic counteron;

The structure commonly shared by sulfonic acid derivatives is shown as follows:

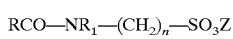

or alkyl aryl —SO$_3$Z or

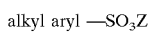

or

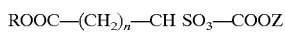

or

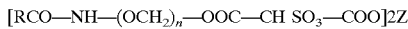

or

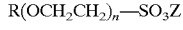

where
R=alkyl or aliphatic hydrocarbon, normal or branched, saturated or unsaturated, substituted or unsubstituted, with or without esterification, with or without etherification, with or without sulfonation, with or without hydroxylation, C chain≧4C;
$R_1$=alkyl or hydroxy alkyl, C chain≧1C;
n≧1;
Z=H or other counterion.
The structure commonly shared by sulfuric acid derivatives is shown as follows:

R—O SO$_3$Z where
R =aliphatic hydrocarbon, normal or branched, saturated or unsaturated, substituted or unsubstituted, with or without esterification, with or without etherification, with or without sulfonation, with or without hydroxylation, with or without ethoxylation or propoxylation, C chain≧4C
Z=H or other counterion.
The structure commonly shared by phosphoric acid derivatives is shown as follows:

R—O PO$_3$Z where:
R=aliphatic hydrocarbon, normal or branched, saturated or unsaturated, substituted or unsubstituted, with orwithout esterification, with or without etherification, with or without sulfonation, with or without hydroxylation, with or without ethoxylation or propoxylation, C chain≧4C; and
Z=H or other counterion.

With regard to the cationics, these are surfactants with positively charged atom, most commonly nitrogen, on the hydrophobic end. The charge may be permanent and non-pH dependent (such as quatemary ammonium compounds) or pH dependent (such as cationic amines). They include alkyl substituted ammonium salts, heterocyclic ammonium salts, alkyl substituted imidazolinium salts and alkyl amines.
The structure commonly shared by this group is shown as follows:

N$^+$R$_4$Z$^-$ where:
R=H, alkyl, hydroxyalkyl, ethoxylated and/or propoxylation alkyl, benzyl, or aliphatic hydrocarbon, normal or branched, saturated or unsaturated, substituted or unsubstituted, with or without esterification, with or without etherification, with or without sulfonation, with or without hydroxylation, with or without carboxylation, with or without ethoxylation or propoxylation, C chain≧4C. The R groups may be the same or different; and
Z=Counterion including halide, hydroxide, etc.

With regard to the nonionics, in this group the molecule has no charge. The hydrophilic end often contains a polyether (polyoxyethylene) or one or more hydroxyl groups. They generally include alcohols, alkylphenols, esters, ethers, amine oxides, alkylamines, alkylamides, polyalkylene oxide block copolymers.

Modified Vinyl Polymers Containing Amphiphilic Hydrocarbon Moieties

There are several envisioned pathways in which modified vinyl polymers and amphiphilic hydrocarbons can be combined onto a single molecule for purposes of this invention. These include, but are not limited to: (1) direct monomer incorporation or copolymerization; (2) derivatization of functional groups on the polymer backbone; and (3) block co-polymerization.

The molar and weight ratios of the various functional groups on the polymer will largely depend on the specific application of the material and is not a critical aspect of the invention. However, the portion of the synthetic polymer [$Q_1$] capable of forming hydrogen, covalent and ionic bonds can constitute from about 10 to about 95 mole percent of the total polymer, more specifically from about 20 to about 90 mole percent of the total polymer and still more specifically from about 30 to about 85 mole percent of the total polymer. The amphiphilic hydrocarbon portion [$Q_2$] of the synthetic polymer can constitute from about 1 to about 90 mole percent of the synthetic polymer, more specifically from about 2 to about 80 mole percent of the synthetic polymer and still more specifically from about 3 to about 70 mole percent of the synthetic polymer. The charge containing portion [$Q_3$] of the synthetic polymer can be comprised of monomer units constituting from 0 to about 80 mole percent of the total monomer units in the synthetic polymer, more specifically from 0 to about 30 mole percent and still more specifically from about 2 to about 20 mole percent. The [$Q_4$] functionality will be comprised of monomer units constituting from 0 to about 80 mole percent of the total monomer units in the synthetic polymer, more specifically from 0 to about 40 mole percent and still more specifically from 0 to about 20 mole percent.

Likewise the molecular weight of the synthetic polymers of the present invention will largely depend on the specific application of the material and is not overly critical to the invention. The weight average molecular weight range can be from about 1,000 to about 5,000,000, more specifically from about 10,000 to about 2,000,000 and still more specifically from about 20,000 to about 1,000,000. Where these polymers are added for dry strength it is important that the molecular weight of the polymer be low enough so as to not bridge between particles and cause flocculation, and yet high enough so as to retard migration of the polymer into the pores of the fibers. These materials can have weight average molecular weights in the range of from about 5,000 to about 2,000,000, more specifically from about 10,000 to about 1,500,000 and still more specifically from about 20,000 to about 1,000,000.

Direct Monomer Incorporation

Incorporation of the amphiphilic moieties can be accomplished via copolymerization with vinyl type monomers containing amphiphilic groups. Almost any vinyl type monomer containing a pendant amphiphilic moiety can be copolymerized with acrylamide or a similar vinyl monomer containing a pendant hydrogen-bonding moiety to be incorporated into the polymer backbone. Generically the synthesis can be described in FIG. 7.

FIG. 7

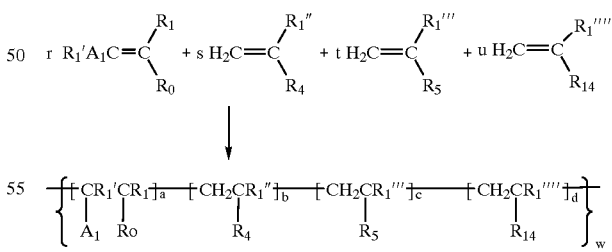

where:
$R_1, R_1', R_1'', R_1''', R_1''''$=H, $C_{1-4}$ alkyl;
a, b≧1;
c,d ≧0;
w ≧1;
r,s ≧1;
t,u ≧0;
a*w=r; b*w=s; c*w=t; d*w=u;

$R_0$=any group capable of forming hydrogen bonds. Preferred but not limited to are—$CONH_2$, COOH, COO— including mixtures of said groups;

$A_1$=H, COOH;

$R_4$=an amphiphilic hydrocarbon radical; It may be an alkyl hydrocarbon radical with hydrophilic functionality such as —OH, or ethoxy or propoxy groups, or an aliphatic hydrocarbon radical with hydrophilic functionality. The hydrocarbons can be linear or branched, saturated or unsaturated, substituted or unsubstituted, with 2 or more hydrocarbons.

$R_5$=$Z_2$—$R_{10}$—W, where:

$Z_2$=Ar, $CH_2$, COO—, CONH—, —O—, —S—, —$OSO_2O$—, any radical capable of bridging the $R_{10}$ group to the vinyl backbone portion of the molecule. $R_{10}$= any linear or branched, aliphatic or aromatic hydrocarbon of 2 or more carbons, preferably —($CH_2CH_2$)—, —$C(CH_3)_2CH_2CH_2$—;

W=—$N+R_{11},R_{12},R_{13}$, where $R_{11},R_{12},R_{13}$ is a $C_{1-4}$ alkyl group.

$R_5$ may also be the residue formed by copolymerization with dimethyldiallyl ammonium chloride. In this case the residue will be the form of monomers with repeat units of structure

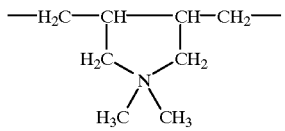

$R_{14}$=a hydrophilic moiety, which is desirable for making the material into a form suitable for papermaking to compensate for any increased hydrophobicity that may be introduced via incorporation of the amphiphilic hydrocarbon moiety.

A wide variety of ethylenically unsaturated vinyl monomers containing amphiphilic moieties are known in the art. Poly(ethylene glycol) and poly(propylene glycol) based acrylates, methacrylates and derivatives including poly(ethylene glycol) acrylate, poly(propylene glycol) acrylate, poly(ethylene glycol) methacrylate, poly(propylene glycol) methacrylate, poly(ethylene glycol) mono-ether acrylates and methacrylates including methyl, butyl, hexyl, octyl, nonyl, decyl, dodecyl, tetradecyl, pentadecyl, hexadecyl, heptadecyl, octadecyl as well as the analogous poly(propylene glycol) derivatives and the like are known commercially available materials. Also known are the mono-aryl ether derivatives which include poly(ethylene glycol) 4-nonylphenyl ether acrylate, poly(ethylene glycol) phenyl ether acrylate, poly(ethylene glycol) 2,4,6-tris(1-phenylethyl)phenyl ether methacrylate and the like. Such monomers can easily be derived from the esterification of acrylic acid, methacrylic acid and the like with the poly(ethylene glycol) and poly(propylene) glycol and corresponding mono ethers including but not limited to such materials as poly(ethylene glycol) mono butyl ether, poly(ethylene glycol) mono octyl ether, poly(ethylene glycol) mono decyl ether, poly(ethylene glycol) mono dodecyl ether, poly(ethylene glycol) mono lauryl ether, poly(ethylene glycol) mono octadecyl ether, the corresponding poly(propylene glycol) and mixed poly(propylene glycol) and poly(ethylene glycol) mono ether derivatives.

Also known are the corresponding allyl ether derivatives of polyethylene glycol and polypropylene glycol. Such materials are generally synthesized from the reaction of an allyl halide and hydroxy compound in the presence of sodium hydroxide. Examples of such monomers include allyl polyethylene glycol, methallyl polyethylene glycol, methoxy allyl polyethylene glycol, butoxy allyl polyethylene glycol and the like. Such allyl ether materials generally conforming to the formula:

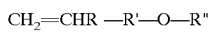

Where:

R=H, $C_{1-4}$ alkyl

R'=polyethylene glycol, polypropylene glycol, or mixed polyethylene/polypropylene glycol radical R"=$C_1$–$C_{30}$ alkyl or aryl radical They would be expected to incorporate into any vinyl type polymer such as a PAM, PVA, etc. Evani, et al., U.S. Pat. No. 4,921,902 describes incorporation of such monomers into a non-ionic polyacrylamide backbone, such materials being found useful for mobility control and fracturing fluids in oil recovery operations.

Other examples of amphiphilic monomers that would expected to be incorporated via this process include carboxybetaines and sulfobetaines as described by Samour in U.S. Pat. No. 3,671,502. The copolymers of these materials with hydroxyalkyl acrylates were found to be useful for binders in various applications. Additional examples include but are not limited to such materials as those described by Valint, et al., in U.S. Pat. No. 5,177,165 and Robinson in U.S Pat. No. 5,874,495.

The aforementioned examples are not meant to limit the scope of the invention. Indeed any of the generic amphoteric materials described previously can be incorporated via the aforementioned copolymerization technique provided there is a single ethylenically unsaturated point within the amphoteric molecule. They would be incorporated directly into the polymer during the polymerization process as described in FIG. 7. When incorporated into the polymer in this manner the amphiphilic hydrocarbons are arranged in a pendant fashion off the polymer backbone. Polymers of the type shown in FIG. 7, which maintain pendant unsubstituted amide functionality, may further be modified to produce materials exhibiting temporary wet strength as well as dry strength. Most notably this may be accomplished through reaction with glyoxal. A specific reaction scheme is given in FIG. 8.

FIG. 8

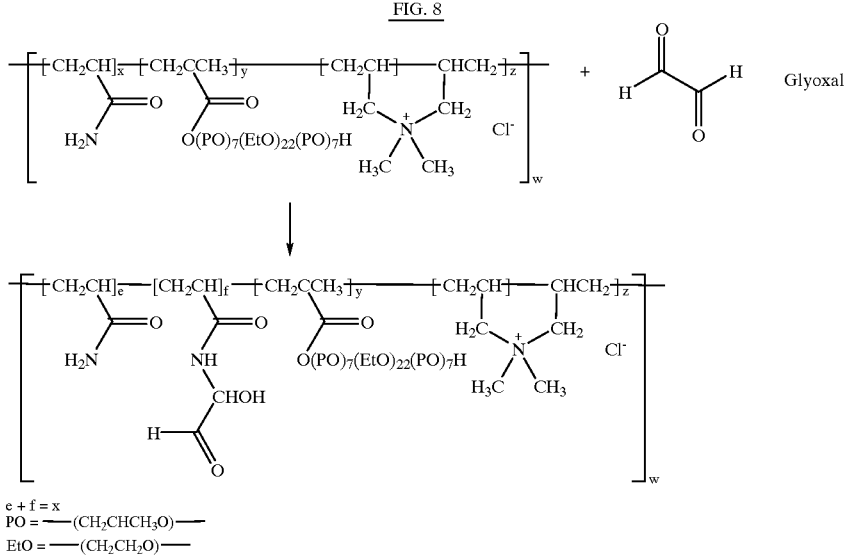

e + f = x
PO = —(CH$_2$CHCH$_3$O)—
EtO = —(CH$_2$CH$_2$O)—

It should be appreciated that several different polymeric structures are possible when synthesizing polymers in the aforementioned manner. Such characteristics can be tailored into the polymer depending on the synthesis pathway chosen. If the monomers are mixed concurrently a random A-B-A-B-A-B type copolymer will be formed. If the monomers are mixed consecutively AAAAA-BBBB-AAMAA-BBBB type block copolymers can be formed. The size of the individual blocks can be controlled through any of the means known in the art. Although not critical to the invention those skilled in the art will recognize the potential for different behaviors depending upon the specific structure of the copolymer. Where more than one co-monomer is used mixtures of random and block copolymers can be designed depending on the synthetic approach used.

Derivitization of functional groups on the polymer backbone

The second approach to synthesis of materials of this invention is to modify the functional groups on the polymer backbone. The vinyl type polymers, including the modified polyacrylamides, polyacrylic acid and polyvinyl alcohol contain functional groups that may be further derivatized to produce materials of FIG. 4. The polymer functional groups which may be reacted upon include but are not limited to: amide, carboxyl, hydroxyl, cyano, and aldehyde (from glyoxylation or similar reaction). The general scheme for such syntheses is shown in FIG. 9.

FIG. 9

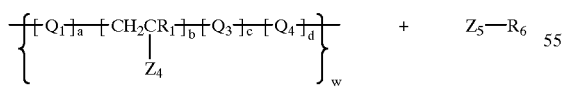

where:
$R_1$=H, $C_{1-4}$ alkyl;
$a,b \geq 1$;
$c,d \geq 0$;
$Q_1$=a monomer unit or a block or graft copolymer containing a pendant group capable of forming hydrogen or covalent bonds with cellulose. Preferred pendant groups for hydrogen bonding are —CONH$_2$, —COO$^{-+}$M, —OH and mixtures of said groups. Preferred pendant groups for covalent bonding are aldehydes and anhydrides. M+ can be any suitable counter ion including Na$^+$, K$^+$, Ca$^{+2}$ and the like;

$Q_3$=a monomer unit or a block or graft copolymer containing a charge functionality. Such charge functionality is preferably cationic but may be anionic or amphoteric;

$Z_4$= —CONHCHOHCHO, —CHO, —CONH$_2$, —COOH, —CN, —OH, —SH, —NH$_2$, —R'OH, —R'CHO, —R'CONH$_2$, —R'COOH, —R'CN, —R'OH, —R'SH, —R'NH$_2$, —RSO3H, —ROSO$_3$H, or any other functional group capable of being reacted upon in a manner so as to incorporate the amphiphilic hydrocarbon moiety into the polymer and R' can be any bridging radical whose purpose is to attach the functional group to the polymer; and $Q_4$=a monomer unit or a block or graft copolymer containing a hydrophilic moiety, which is desirable for making the material into a form suitable for papermaking. $Q_4$ may take the form of —$Z_2$—$Q_4$—$Z_2$'— where $Z_2$, $Z_2$' are any bridging radicals, the same or different, whose purpose is to provide incorporation into the polymer backbone and $Q_4$ is as defined previously. $Q_4$ may be incorporated to offset the increased polymer hydrophobicity caused by introduction of the aliphatic hydrocarbon mnoieties. Examples of suitable $Q_4$ moieties are (but is not limited to) the aliphatic polyether derivatives of the formula —[(CR$_1$R$_2$)$_x$]$_y$—R$_3$, wherin $R_1,R_2$ is H or CH$_3$, $x \geq 2$, $y \geq 2$ and $R_3$ is any suitable terminal group including —CH$_3$, —H, —C$_2$H$_5$, —NH$_2$.

$Z_5$=HOOC—, ClOC—, HO—, HS—, —COOOC—, H$_2$N—, HCO—, ClSO$_2$O—, XOC—(X=halo), ClCOO—, or any other functional group capable of reaction with a $Z_4$ type functional group so as to attach the —R$_6$ residue onto the polymer;

$R_6$=an amphiphilic hydrocarbon radical.

If the end block functional groups ($Z_4$ and/or $R_0$) is not reactive enough, further modification can be made prior to the incorporation of the amphiphilic moieties to ensure better yield. The general scheme for such modification is shown in FIG. 10.

Figure 11:
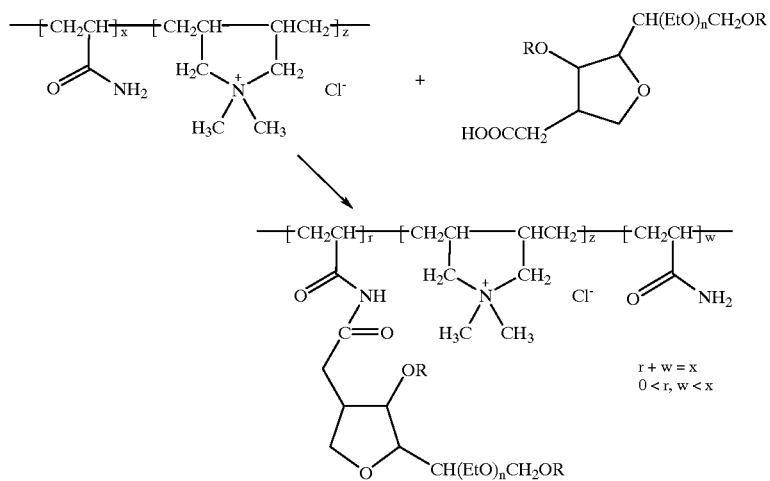
Figure 12:
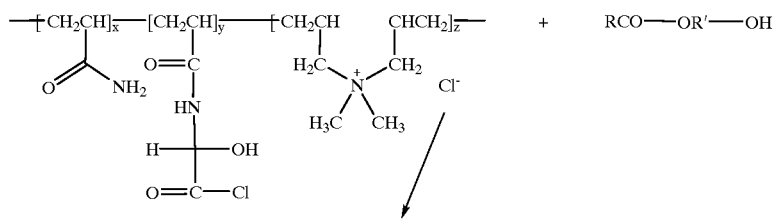

Acylation of the Vinyl Polymer Backbone:

Some specific examples of such reactions are given in FIGS. 11–12.

where
R=H, alkyl, aliphatic hydrocarbon, substituted or non-substituted, linear or branched or cyclic, C>,=6

-continued

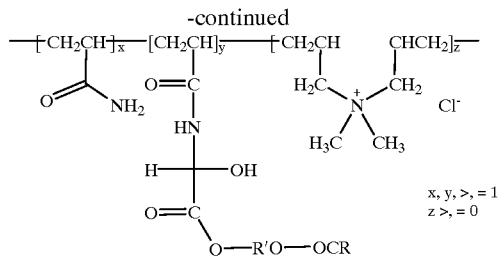

x, y, >, = 1
z >, = 0 where
R=alkyl, aliphatic hydrocarbon, branched or linear or cyclic, substituted or non-substituted, with or without ethoxylation
R'=ethoxylated alkyl or aliphatic hydrocarbon, branched or linear or cyclic, substituted or nonsubstituted.
Block copolymerization.

PAM's containing block copolymers of polyethylene, polytetraflouroethylene, or any other linear or branched, saturated or unsaturated, substituted or non-substituted, hydrocarbon where such co-polymers are incorporated either as block copolymers as grafts onto the vinyl backbone. Note that since these polymers maintain pendant amide functionality they are capable of being glyoxylated to form materials possessing temporary wet strength. A general example of such materials is shown in FIG. 13.

FIG. 13

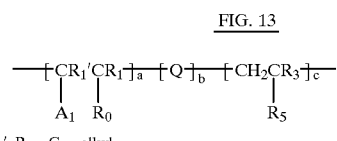

$R_1, R_1', R_3 = C_{1-4}$ alkyl
a, b > 0
c >, = 0 where:
$R_0$=any group capable of forming hydrogen or covalent bonds with cellulose. Preferred are —$CONH_2$, COOH, COO—, —OH, —CONHCHOHCHO including mixtures of said groups;
$A_1$=H, COOH;
Q=radical of form —Z—$R_2$—Z—;
$R_2$=a block or graft copolymer where the amphiphilic functionality is built in. It may be alkyl hydrocarbons with hydrophilic (such as —OH, or ethoxy groups) functionality, or aliphatic hydrocarbons with hydrophilic functionality. The hydrocarbons could be linear or branched, saturated or unsaturated, substituted or unsubstituted, with 4 or more hydrocarbons.
Z=any bridging radical whose purpose is to provide incorporation into the polymer backbone;
$R_5$=$Z_2$—$R_{10}$—W, where:
$Z_2$=Ar, $CH_2$, COO—, CONH—, —O—, —S—, —$OSO_2O$—, any radical capable of bridging the $R_{10}$group to the vinyl backbone portion of the molecule;
$R_{10}$=any linear or branched, aliphatic or aromatic hydrocarbon of 2 or more carbons, preferably —($CH_2CH_2$)—, —$C(CH_3)_2CH_2CH_2$—;
W=—$N+R_{11},R_{12},R_{13}$ where$R_{11},R_{12},R_{13}$ is a $C_{1-4}$ alkyl group.
$R_5$ may also be the residue formed by co-polymerization with dimethyldiallyl ammonium chloride. In this case the residue will be the form of monomers with repeat units of structure

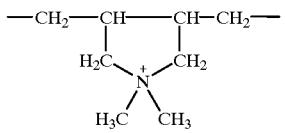

It will be appreciated that the foregoing examples, given for purposes of illustration, are not to be considered as limiting the scope of this invention, which is defined by the following claims and all equivalents thereto.

What is claimed is:
1. A paper sheet comprising a synthetic polymer having a moiety capable of forming covalent or hydrogen bonds with cellulose and containing one or more amphiphilic hydrocarbon moieties, said polymer having the following structure:

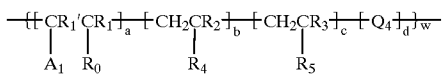

where:
$w \geq 1$;
$R_1, R_1', R_2, R_3$=H or $C_{1-4}$ alkyl;
a,b >0;
c,d $\geq$0;
$R_0$=a group capable of forming hydrogen or covalent bonds with cellulose;
$Q_4$=a monomer unit or a block or graft copolymer containing a hydrophilic moiety;
$A_1$=—H, —COOH;
$R_4$=a $Z_1$—$R_6$ radical,
where:
$Z_1$=any radical capable of bonding the $R_6$ group to the polymer,
$R_6$=a block or graft copolymer containing the amphiphilic hydrocarbon moiety;
$R_5$=$Z_1$—$R_{10}$—W,
where:
$Z_1$=any radical capable of bonding the $R_{10}$ group to the polymer;
$R_{10}$=any linear or branched, aliphatic or aromatic hydrocarbon of 2 or more carbons; and
W=—$N^+R_{11},R_{12},R_{13}$, where $R_{11},R_{12},R_{13}$ are $C_{1-4}$ alkyl groups.
2. The paper sheet of claim 1 wherein $R_0$ is selected from the group consisting of $CONH_2$, —COOH, —$COOH^{-M+}$, —OH, —CONHCHOHCHO, and mixtures thereof, wherein $M^+$ is a counter ion.
3. The paper sheet of claim 1 wherein $Q_4$ is of the form —$Z_2$—$Q_4$—$Z_2'$— where $Z_2, Z_2'$ are bridging radicals, which can be the same or different.

4. The paper sheet of claim 1 wherein $Z_1$ is selected from the group consisting of aryl, $CH_2$—, —COO—, —CONR'—, —O—, —S—, —OSO$_2$O—, —CONHCO—, and —CONHCHOHCHOO—, and where R' is H or $C_{1-4}$ alkyl.

5. The paper sheet of claim 1 wherein $Z_1$ is selected from the group consisting of aryl, —CH$_2$—, —COO—, —CONH—, —O—, —S—, and —OSO$_2$O—.

6. The paper sheet of claim 1 wherein $R_{10}$ is —(CH$_2$CH$_2$)— or —C(CH$_3$)CH$_2$CH$_2$—.

7. The paper sheet of claim 1 wherein $A_1$ is —H and $R_0$ is —CONH$_2$.

8. The paper sheet of claim 1 wherein $A_1$ is —H and $R_0$ is —CONHCHOHCHO.

9. The paper sheet of claim 1 wherein $R_0$ consists of both —CONH$_2$ and CONHCHOHCHO groups.

10. A paper sheet comprising a synthetic polymer having a moiety capable of forming covalent or hydrogen bonds with cellulose and containing one or more amphiphilic hydrocarbon moieties, said polymer having the following structure:

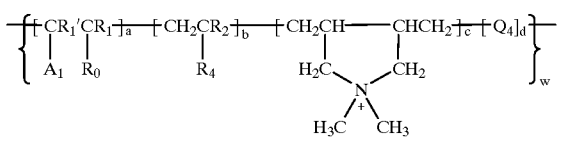

where:
$w \geq 1$;
$R_1, R_1', R_2, R_3 =$ H or $C_{1-4}$ alkyl;
$a, b > 0$;
$c, d \geq 0$
$R_0 =$ a group capable of forming hydrogen or covalent bonds with cellulose;
$Q_4 =$ a monomer unit or a block or graft copolymer containing a hydrophilic moiety;
$A_1 =$ —H, —COOH;
$R_4 =$ a $Z_1$—$R_6$ radical,
where:
$Z_1 =$ any radical capable of bonding the $R_6$ group to the polymer;
$R_6 =$ an amrhiphilic hydrocarbon radical.

11. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymer is added to the aqueous suspension of fibers and/or the web, said polymer having the following structure:

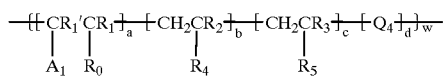

where:
$w \geq 1$;
$R_1, R_1', R_2, R_3 =$ H or $C_{1-4}$ alkyl;
$a, b > 0$;
$c, d \geq 0$;
$R_0 =$ a group capable of forming hydrogen or covalent bonds with cellulose;
$Q_4 =$ a monomer unit or a block or graft copolymer containing a hydrophilic moiety;
$A_1 =$ —H, —COOH;
$R_4 =$ a $Z_1$—$R_6$ radical,
where:
$Z_1 =$ any radical capable of bonding the $R_6$ group to the polymer;
$R_6 =$ a block or graft copolymer containing the amphiphilic hydrocarbon moiety
$R_5 = Z_1$—$R_{10}$—W,
where:
$Z_1 =$ any radical capable of bonding the $R_{10}$ group to the polymer;
$R_{10} =$ any linear or branched, aliphatic or aromatic hydrocarbon of 2 or more carbons; and
W=—N$^+$R$_{11}$,R$_{12}$,R$_{13}$, where R$_{11}$, R$_{12}$,R$_{13}$ are $C_{1-4}$ alkyl groups.

12. The method of claim 11 wherein $R_0$ is selected from the group consisting of CONH$_2$, —COOH, —COO$^-$M$^+$, —OH, —CONHCHOHCHO, and mixtures thereof, wherein M$^+$ is a counter ion.

13. The method of claim 11 wherein $Q_4$ is of the form —$Z_2$—$Q_4$—$Z_2'$— where $Z_2$, $Z_2'$ are bridging radicals, which can be the same or different.

14. The method of claim 11, wherein $Z_1$ is selected from the group consisting of aryl, —CH$_2$—, —COO—, —CONR'—, —O—, —S—, —OSO$_2$O—, —CONHCO—, and —CONHCHOHCHOO—, and where R' is H or $C_{1-4}$ alkyl.

15. The method of claim 11, wherein $Z_1$ is selected from the group consisting of aryl, —CH$_2$—, —COO—, —CONH—, —O—, —S—, and —OSO$_2$O—.

16. The method of claim 11 wherein $R_{10}$ is —(CH$_2$Ch$_2$)— or —C(CH$_3$)$_2$CH$_2$CH$_2$—.

17. The method of claim 11 wherein $A_1$ is —H and $R_0$ is —CONH$_2$.

18. The method of claim 11 wherein $A_1$ is —H and $R_0$ is —CONHCHOHCHO.

19. The method of claim 11 wherein $R_0$ consists of both —CONH$_2$ and CONHCHOHCHO groups.

20. A paper sheet comprising a synthetic polymer having a moiety capable of forming covalent or hydrogen bonds with cellulose and containing one or more amphiphilic hydrocarbon moieties, said polymer having the following structure:

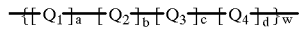

where:
$a, b > 0$;—
$c \geq 0$;
$d > 0$;
$w \geq 1$;
$Q_1 =$ a monomer unit or a block or graft copolymer containing a pendant group capable of forming hydrogen or covalent bonds with cellulose;
$Q_2 =$ an ethylenically unsaturated viny monomer unit or a block or graft copolymer containing the amphiphilic hydrocarbon moiety;
$Q_3 =$ a monomer unit or a block or graft copolymer containing a charge functionality; and
$Q_4 =$ a monomer unit or a block or graft copolymer containing a hydrophilic moiety, which is desirable for making the material into a form suitable for papermaking.

21. The paper sheet of claim 20 wherein the pendant group on $Q_1$ capable of forming hydrogen or covalent bonds is selected from the group consisting of —$CONH_2$, —COOH, —COO$^-$M$^+$, —OH, —CONHCHOHCHO and mixtures thereof, wherein M$^+$ is a counter ion.

22. The paper sheet of claim 20 wherein $Q_2$ is of the form —$Z_1$—$Q_2$—$Z_1'$— where $Z_1$, $Z_1'$ are bridging radicals, which can be the same or different.

23. The paper sheet of claim 20 wherein $Q_4$ is of the form —$Z_2$—$Q_4$—$Z_2'$— where $Z_2$, $Z_2'$ are bridging radicals, which can be the same or different.

24. The paper sheet of claim 20 wherein $Q_4$ is a radical of the form —$CHR_1CR_{30}R_1'$— wherein $R_{30}$ is an aliphatic polyether derivative of the formula —$[(CR_2R_2')_xO]_y$—$R_3$ where:

$R_1, R_1'$ is —H, $C_{1-4}$ alkyl;

$R_2, R_2'$ is —H or —$CH_3$;

$x \geq 2$;

$y \geq 2$; and $R_3$ is a terminal group selected from the group consisting of —$CH_3$, —H, —$C_2H_5$, and —$NH_2$.

25. The paper sheet of claim 20 wherein $Q_3$ is

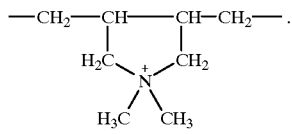

26. The paper sheet of claim 20 wherein $Q_3$ is a radical of the form —$CHR_1CR_{20}R_1'$— wherein:

$R_{20}$=a pendant group of the form $Z_1$—$R_{10}$—W where $Z_1$ is a bridging radical capable of bonding the $R_{10}$ group to the polymer;

$R_1, R_1'$=H or a $C_{1-4}$ alkyl group;

$R_{10}$=any linear or branched, aliphatic or aromatic hydrocarbon of 2 or more carbons; and W=—N+$R_{11}, R_{12}, R_{13}$ where $R_{11}, R_{12}, R_{13}$ is a $C_{1-4}$ alkyl group.

27. The paper sheet of claim 26 wherein $Z_1$ is selected from the group consisting of aryl, —$CH_2$—, —COO—, —CONH—, —O—, —S—, and —$OSO_2O$—.

28. The paper sheet of claim 26 wherein $R_{10}$ is —($CH_2CH_2$)— or —$C(CH_3)_2CH_2CH_2$—.

29. The paper sheet of claim 20 wherein "c" is 0.

30. The paper sheet of claim 20 wherein the pendant group on $Q_1$ capable of forming hydrogen bonds is —$CONH_2$.

31. The paper sheet of claim 20 twherein the pendant group on $Q_1$ capable of forming covalent bonds is —CONHCHOHCHO.

32. The paper sheet of claim 20 wherein $Q_1$ has —$CONH_2$ and —CONHCHOHCHO pendant groups.

33. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymer is added to the aqueous suspension of fibers and/or the web, said polymer having the following structure:

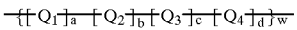

where:

a,b>0;

c$\geq$0;

d>0;

w$\geq$1;

$Q_1$=a monomer unit or a block or graft copolymer containing a pendant group capable of forming hydrogen or covalent bonds with cellulose;

$Q_2$=an ethylenically unsaturated vinyl monomer unit or a block or graft copolymer containing the amphiphilic hydrocarbon moiety;

$Q_3$=a monomer unit or a block or graft copolymer containing a charge functionality; and $Q_4$=a monomer unit or a block or graft copolymer containing a hydrophilic moiety, which is desirable for making the material into a form suitable for papermaking.

34. The method of claim 33 wherein the pendant group on $Q_1$ capable of forming hydrogen or covalent bonds is selected from the group consisting of —$CONH_2$, —COOH, —COO$^-$M$^+$, —OH, —CONHCHOHCHO and mixtures thereof, wherein M$^+$ is a counter ion.

35. The method of claim 33 wherein $Q_2$ is of the form —$Z_1$—$Q_2$—$Z_1'$— where $Z_1$, $Z_1'$ are bridging radicals, which can be the same or different.

36. The method of claim 33 wherein $Q_4$ is of the form —$Z_2$—$Q_4$—$Z_2'$— where $Z_2$, $Z_2'$ are bridging radicals, which can be the same or different.

37. The method of claim 33 wherein $Q_4$ is a radical of the form —$CHR_1CR_{30}R_1'$— wherein $R_{30}$ is an aliphatic polyether derivative of the formula —$[(CR_2R_2')_xO]_y$—$R_3$ where:

$R_1, R_1'$ is —H, $C_{1-4}$ alkyl;

$R_2, R_2'$ is —H or —$CH_3$;

$x \geq 2$;

$y \geq 2$; and $R_3$ is a terminal group selected from the group consisting of —$CH_3$, —H, —$C_2H_5$, and —$NH_2$.

38. The method of claim 33 wherein $Q_3$ is

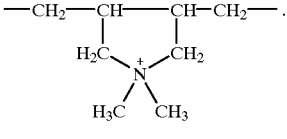

39. The method of claim 33 wherein $Q_3$ is a radical of the form —$CHR_1CR_{20}R_1'$— wherein $R_{20}$=pendant group of the form $Z_1$—$R_{10}$—W, where $Z_1$ is a bridging radical capable of bonding the $R_{10}$ group to the polymer;

$R_1, R_1'$=H or a $C_{1-4}$ alkyl group;

$R_{10}$=any linear or branched, aliphatic or aromatic hydrocarbon of 2 or more carbons; and W=—N+$R_{11}, R_{12}, R_{13}$ where $R_{11}, R_{12}, R_{13}$ is a $C_{1-4}$ alkyl group.

40. The method of claim 39 wherein $Z_1$ is selected from the group consisting of aryl, —$CH_2$—, —COO—, —CONH—, —O—, —S—, and —$OSO_2O$—.

41. The method of claim 39 wherein $R_{10}$ is —$(CH_2CH_2)$— or —$C(CH_3)_2CH_2CH_2$—.

42. The method of claim 33 wherein "C" is 0.

43. The method of claim 33 wherein the pendant group on $Q_1$ capable of forming hydrogen bonds is —$CONH_2$.

44. The method of claim 33 wherein the pendant group on $Q_1$ capable of forming covalent bonds is —CONHCHOHCHO.

45. The method of claim 33 wherein $Q_1$ has —$CONH_2$ and —CONHCHOHCHO pendant groups.

46. A paper sheet comprising a synthetic polymer having a moiety capable of forming covalent or hydrogen bonds with cellulose and containing one or more amphiphilic hydrocarbon moieties, said polymer having the following structure:

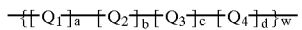

where:
a,b>0;
c,d≧0;
w≧1;
$Q_1$ is selected from the group consisting of —$CONH_2$, —COOH, —COO$^-$M$^+$, —OH, —CONHCHOHCHO and mixtures thereof, wherein M$^+$ is a counter ion;
$Q_2$=an ethylenically unsaturated vinyl monomer unit or a block or graft copolymer containing the amphiphilic hydrocarbon moiety;
$Q_3$=a monomer unit or a block or graft copolymer containing a charge functionality; and
$Q_4$=a monomer unit or a block or graft copolymer containing a hydrophilic moiety, which is desirable for making the material into a form suitable for papermaking.

47. The paper sheet of claim 46 wherein $Q_2$ is of the form —$Z_1$—$Q_2$—$Z_1'$— where $Z_1$, $Z_1'$ are bridging radicals, which can be the same or different.

48. The paper sheet of claim 46 wherein $Q_4$ is of the form —$Z_2$—$Q_4$—$Z_2'$— where $Z_2$, $Z_2'$ are bridging radicals, which can be the same or different.

49. The paper sheet of claim 46 wherein $Q_4$ is a radical of the form —$CHR_1CR_{30}R_1'$— wherein
$R_{30}$ is an aliphatic polyether derivative of the formula —$[(CR_2R_2')_xO]_y$—$R_3$
where:
$R_1,R_1'$ is —H, $C_{1-4}$ alkyl;
$R_2,R_2'$ is —H or —$CH_3$;
x≧2;
y≧2; and
$R_3$ is a terminal group selected from the group consisting of —$CH_3$, —H, —$C_2H_5$, and —$NH_2$.

50. The paper sheet of claim 46 wherein $Q_3$ is

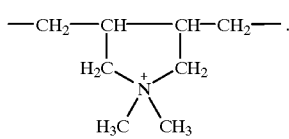

51. The paper sheet of claim 46 wherein $Q_3$ is a radical of the form —$CHR_1CR_{20}R_1'$— wherein:
$R_{20}$=a pendant group of the form $Z_1$—$R_{10}$—W where $Z_1$ is a bridging radical capable of bonding the $R_{10}$ group to the polymer;

$R_1,R_1'$=H or a $C_{1-4}$ alkyl group;
$R_{10}$=any linear or branched, aliphatic or aromatic hydrocarbon of 2 or more carbons; and
W=—N+$R_{11},R_{12},R_{13}$ where $R_{11},R_{12},R_{13}$ is a $C_{1-4}$ alkyl group.

52. The paper sheet of claim 51 wherein $Z_1$ is selected from the group consisting of aryl, —$CH_2$—, —COO—, —CONH—, —O—, —S—, and —$OSO_2O$—.

53. The paper sheet of claim 51 wherein $R_{10}$ is —$(CH_2CH_2)$ or —$C(CH_3)_2CH_2CH_2$—.

54. The paper sheet of claim 46 wherein "c" is 0.

55. The paper sheet of claim 46 wherein "d" is 0.

56. The paper sheet of claim 46 wherein the pendant group on $Q_1$ capable of forming hydrogen bonds is —$CONH_2$.

57. The paper sheet of claim 46 wherein the pendant group on $Q_1$ capable of forming covalent bonds is —CONHCHOHCHO.

58. The paper sheet of claim 46 wherein $Q_1$ has —$CONH_2$ and —CONHCHOHCHO pendant groups.

59. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymer is added to the aqueous suspension of fibers and/or the web, said polymer having the following structure:

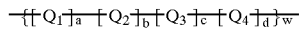

where:
a,b>0;
c≧0;
d>0;
w≧1;
$Q_1$ is selected from the group consisting of —$CONH_2$, —COOH, —COO$^-$M$^+$, —OH, —CONHCHOHCHO and mixtures thereof, wherein M$^+$ is a counter ion;
$Q_2$=an ethylenically unsaturated vinyl monomer unit or a block or graft copolymer containing the amphiphilic hydrocarbon moiety;
$Q_3$=a monomer unit or a block or graft copolymer containing a charge functionality; and
$Q_4$=a monomer unit or a block or graft copolymer containing a hydrophilic moiety, which is desirable for making the material into a form suitable for papermaking.

60. The method of claim 59 wherein $Q_2$ is of the form —$Z_1$—$Q_2$—$Z_1'$— where $Z_1$, $Z_1'$ are bridging radicals, which can be the same or different.

61. The method of claim 59 wherein $Q_4$ is of the form —$Z_2$—$Q_4$—$Z_2'$— where $Z_2$, $Z_2'$ are bridging radicals, which can be the same or different.

62. The method of claim 59 wherein $Q_4$ is a radical of the form —$CHR_1CR_{30}R_1'$— wherein $R_{30}$ is an aliphatic polyether derivative of the formula —$[(CR_2R_2')_xO]_y$—$R_3$
where:
$R_1,R_1'$ is —H, $C_{1-4}$ alkyl;
$R_2,R_2'$ is —H or —$CH_3$;
x≧2;
y≧2; and
$R_3$ is a terminal group selected from the group consisting of —$CH_3$, —H, —$C_2H_5$, and —$NH_2$.

63. The method of claim 59 wherein $Q_3$ is

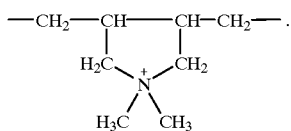

64. The method of claim 59 wherein $Q_3$ is a radical of the form —$CHR_1CR_{20}R_1'$— wherein
$R_{20}$=pendant group of the form $Z_1$—$R_{10}$—W, where $Z_1$ is a bridging radical capable of bonding the $R_{10}$ group to the polymer;
$R_1,R_1'$=H or a $C_{1-4}$ alkyl group;
$R_{10}$=any linear or branched, aliphatic or aromatic hydrocarbon of 2 or more carbons; and
W=—N+$R_{11},R_{12},R_{13}$ where $R_{11},R_{12},R_{13}$ is a $C_{1-4}$ allyl group.

65. The method of claim 64 wherein $Z_1$ is selected from the group consisting of aryl, —$CH_2$—, —COO—, —CONH—, —O—, —S—, and —$OSO_2O$—.

66. The method of claim 64 wherein $R_{10}$ is —($CH_2CH_2$)— or —$C(CH_3)_2CH_2CH_2$—.

67. The method of claim 59 wherein "c" is 0.

68. The method of claim 59 wherein "d" is 0.

69. The method of claim 59 wherein the pendant group on $Q_1$ capable of forming hydrogen bonds is —$CONH_2$.

70. The method of claim 59 wherein the pendant group on $Q_1$ capable of forming covalent bonds is —CONHCHOHCHO.

71. The method of claim 59 wherein $Q_1$ has —$CONH_2$ and —CONHCHOHCHO pendant groups.

72. A paper sheet comprising a synthetic polymer having a moiety capable of forming covalent or hydrogen bonds with cellulose and containing one or more amphiphilic hydrocarbon moieties, said polymer having the following structure:

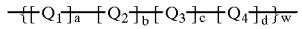

where:
a,b>0;
c,d≧0;
$Q_1$=a monomer unit or a block or graft copolymer containing a pendant group capable of forming hydrogen or covalent bonds with cellulose and is selected from the group consisting of —$CONH_2$, —COOH, —$COO^-$ $M^+$, —OH, —CONHCHOHCHO and mixtures thereof, wherein $M^+$ is a counter ion;
$Q_2$=an ethylenically unsaturated vinyl monomer unit or a block or graft copolymer containing the amphiphilic hydrocarbon moiety;
$Q_3$=a monomer unit or a block or graft copolymer containing a charge functionality; and
$Q_4$=a monomer unit or a block or graft copolymer containing a hydrophilic moiety, which is desirable for making the material into a form suitable for papermaking.

73. The paper sheet of claim 72 wherein the pendant group on $Q_1$ capable of forming hydrogen bonds is —$CONH_2$.

74. The paper sheet of claim 72 wherein the pendant group on $Q_1$ capable of forming covalent bonds is —CONHCHOHCHO.

75. The paper sheet of claim 72 wherein $Q_1$ has —$CONH_2$ and —CONHCHOHCHO pendant groups.

76. A paper sheet comprising a synthetic polymer having a moiety capable of forming covalent or hydrogen bonds with cellulose and containing one or more amphiphilic hydrocarbon moieties, said polymer having the following structure:

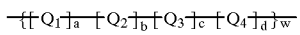

where:
a,b>0;
c,d≧0;
w≧1;
$Q_1$=a monomer unit or a block or graft copolymer containing a pendant group capable of forming hydrogen or covalent bonds with cellulose;
$Q_2$=an ethylenically unsaturated vinyl monomer unit or a block or graft copolymer containing the amphiphilic hydrocarbon moiety;
$Q_3$=a monomer unit or a block or graft copolymer containing a charge functionality; and
$Q_4$=a monomer unit or a block or graft copolymer containing a hydrophilic moiety, which is desirable for making the material into a form suitable for papermaking, and is of the form —$Z_2$—$Q_4$—$Z_2'$— where $Z_2$, $Z_2'$ are bridging radicals, which can be the same or different.

77. A paper sheet comprising a synthetic polymer having a moiety capable of forming covalent or hydrogen bonds with cellulose and containing one or more amphiphilic hydrocarbon moieties, said polymer having the following structure:

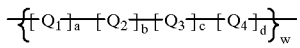

where
a,b>0;
c,d≧0;
w≧1;
$Q_1$=a monomer unit or a block or graft copolymer containing a pendant group capable of forming hydrogen or covalent bonds with cellulose;
$Q_2$=an ethylenically unsaturated vinyl monomer unit or a block or graft copolymer containing the amphiphilic hydrocarbon moiety;
$Q_3$=a monomer unit or a block or graft copolymer containing a charge functionality; and
$Q_4$=a monomer unit or a block or graft copolymer containing a hydrophilic moiety, which is desirable for making the material into a form suitable for papermaking, and is a radical of the form —$CHR_1CR_{30}R_1'$— wherein $R_{30}$ is an aliphatic polyether derivative of the formula —$[(CR_2R_2')_xO]_y$—$R_3$
where:
$R_1,R_1'$ is —H, $C_{1-4}$ alkyl;
$R_2,R_2'$ is —H or —$CH_3$;
x≧2;
y≧2; and
$R_3$ is a terminal group selected from the group consisting of —$CH_3$, —H, —$C_2H_5$, and —$NH_2$.

78. A paper sheet comprising a synthetic polymer having a moiety capable of forming covalent or hydrogen bonds with cellulose and containing one or more amphiphilic hydrocarbon moieties, said polymer having the following structure:

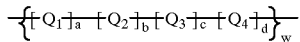

where:
a,b>0;
c,d≧0;
w≧1;
$Q_1$ =a monomer unit or a block or graft copolymer containing a pendant group capable of forming hydrogen or covalent bonds with cellulose;
$Q_2$=an ethylenically unsaturated vinyl monomer unit or a block or graft copolymer containing the amphiphilic hydrocarbon moiety;
$Q_3$=a monomer unit or a block or graft copolymer containing a charge functionality and is a radical of the form —$CHR_1CR_0R_1'$— wherein:
$R_0$=a pendant group of the form $Z_1$—$R_{10}$—W where $Z_1$ is a radical capable of bonding the $R_{10}$ group to the polymer;
$R_1,R_1'$=H or a $C_{1-4}$ alkyl group;
$R_{10}$=any linear or branched, aliphatic or aromatic hydrocarbon of 2 or more carbons; and
W=—N+$R_{11},R_{12},R_{13}$ where $R_{11},R_{12},R_{13}$ is a $C_{1-4}$ alkyl group; and
$Q_4$=a monomer unit or a block or graft copolymer containing a hydrophilic moiety, which is desirable for making the material into a form suitable for papermaking.

79. The paper sheet of claim wherein $Z_1$ is selected from the group consisting of aryl, —$CH_2$—, —COO—, —CONH—, —O—, —S—, and —$OSO_2O$—.

80. The paper sheet of claim 78 wherein $R_{10}$ is —($CH_2CH_2$)—or —$C(CH_3)_2CH_2CH_2$—.

81. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymer is added to the aqueous suspension of fibers and/or the web, said polymer having the following structure:

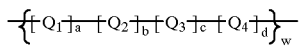

where:
a,b>0;
c,d ≧0;
w≧1;
$Q_1$=a monomer unit or a block or graft copolymer containing a pendant group capable of forming hydrogen or covalent bonds with cellulose and is selected from the group consisting of —$CONH_2$, —COOH, —$COO^-$ $M^+$, —OH, —CONHCHOHCHO and mixtures thereof, wherein $M^+$ is a counter ion;
$Q_2$=an ethylenically unsaturated vinyl monomer unit or a block or graft copolymer containing the amphiphilic hydrocarbon moiety;
$Q_3$=a monomer unit or a block or graft copolymer containing a charge functionality; and
$Q_4$=a monomer unit or a block or graft copolymer containing a hydrophilic moiety, which is desirable for making the material into a form suitable for papermaking.

82. The method of claim 81 wherein the pendant group on $Q_1$ capable of forming hydrogen bonds is —$CONH_2$.

83. The method of claim 81 wherein the pendant group on $Q_1$ capable of forming covalent bonds is —CONHCHOHCHO.

84. The method of claim 81 wherein $Q_1$ has —$CONH_2$ and —CONHCHOHCHO pendant groups.

85. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymer is added to the aqueous suspension of fibers and/or the web, said polymer having the following structure:

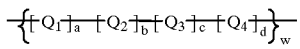

where:
a,b>0;
c,d≧0;
w≧1;
$Q_1$=a monomer unit or a block or graft copolymer containing a pendant group capable of forming hydrogen or covalent bonds with cellulose;
$Q_2$=an ethylenically unsaturated vinyl monomer unit or a block or graft copolymer containing the amphiphilic hydrocarbon moiety;
$Q_3$=a monomer unit or a block or graft copolymer containing a charge functionality; and
$Q_4$=a monomer unit or a block or graft copolymer containing a hydrophilic moiety, which is desirable for making the material into a form suitable for papermaking, and $Q_4$ is a radical of the form —$CHR_1CR_0R_1'$— wherein $R_0$ is an aliphatic polyether derivative of the formula —$[(CR_2R_2')_xO]_y$—$R_3$
where:
$R_1,R_1'$ is —H, $C_{1-4}$ alkyl;
$R_2,R_2'$ is —H or —$CH_3$;
x≧2;
y≧2; and
$R_3$ is a terminal group selected from the group consisting of —$CH_3$, —H, —$C_2H_5$, and —$NH_2$.

86. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymer is added to the aqueous suspension of fibers and/or the web, said polymer having the following structure:

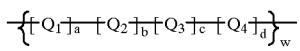

where:

a,b>0;

c,d≧0;

w≧1;

$Q_1$ = a monomer unit or a block or graft copolymer containing a pendant group capable of forming hydrogen or covalent bonds with cellulose;

$Q_2$ = an ethylenically unsaturated vinyl monomer unit or a block or graft copolymer containing the amphiphilic hydrocarbon moiety;

$Q_3$ = a monomer unit or a block or graft copolymer containing a charge functionality and $Q_3$ is a radical of the form —$CHR_1CR_0R_1'$— wherein $R_0$ = pendant group of the form $Z_1$—$R_{10}$—W, where $Z_1$ is a radical capable of bonding the $R_{10}$ group to the polymer;

$R_1,R_1'$ = H or a $C_{1-4}$ alkyl group;

$R_{10}$ = any linear or branched, aliphatic or aromatic hydrocarbon of 2 or more carbons; and W=—N+$R_{11},R_{12},R_{13}$ where $R_{11},R_{12},R_{13}$ is a $C_{1-4}$ alkyl group; and $Q_4$ = a monomer unit or a block or graft copolymer containing a hydrophilic moiety, which is desirable for making the material into a form suitable for papermaking.

87. The method of claim 86 wherein $Z_1$ is selected from the group consisting of aryl, —$CH_2$—, —COO—, —CONH—, —O—, —S—, and —$OSO_2O$—.

88. The method of claim 86 wherein $R_{10}$ is —($CH_2CH_2$)— or —$C(CH_3)_2CH_2CH_2$—.

* * * * *

UNITED STATES PATENT AND TRADEMARK OFFICE
CERTIFICATE OF CORRECTION

PATENT NO. : 6,287,418 B1
DATED : September 11, 2001
INVENTOR(S) : Wen Zyo Schroeder, Daniel Arthur Clarahan, Mike Thomas Goulet and Thomas Gerard Shannon It is certified that error appears in the above-identified patent and that said Letters Patent is hereby corrected as shown below:

Column 2,
Line 7, delete "formn" and substitute -- form --.
Line 21, delete "art" and substitute -- art. --.
Line 41, delete "groups" and substitute -- groups --.
Line 43, delete "su itable" and substitute -- suitable --.
Line 45, delete "graf t" and substitute -- graft --.
Line 59, delete "hydmphilic" and substitute -- hydrophilic --.
Line 60, delete "papendaking" and substitute -- papermaking --.
Line 67, delete "o" and substitute -- $Q_4$ --.

Column 3,
Line 7, delete "countedon" and substitute -- counterion --.
Line 7, delete "Will" and substitute -- will --.
Line 10, delete "counteron" and substitute -- counterion --.
Line 29, delete "0such" and substitute -- 0 such --.
Line 67, delete "dimethyidiallyl" and substitute -- dimethydiallyl --.

Column 4,
Line 41, delete "unsubsfituted" and substitute -- unsubstituted --.
Line 44, delete "$Q_3$=a"
Line 45, insert -- $Q_3$= a -- before "monomer".

Column 8,
Line 1, delete "Fumish" and substitute -- furnish --.
Line 32, delete "photoinitated" and substitute -- photoinitiator --.

Column 14,
Line 21, delete "counteron" and substitute -- counterion --.

Column 15,
Line 23, delete "orwithout" and substitute -- or without --.
Line 31, delete "quatemary" and substitute -- quaternary --.

Column 20,
Line 50, delete "mnoieties" and substitute -- moieties --.

Column 24,
Line 62, delete "---COOH$^{-M+}$" and substitute -- ---COO$^{-M+}$ --.

UNITED STATES PATENT AND TRADEMARK OFFICE
CERTIFICATE OF CORRECTION

PATENT NO.    : 6,287,418 B1
DATED         : September 11, 2001
INVENTOR(S)   : Wen Zyo Schroeder, Daniel Arthur Clarahan, Mike Thomas Goulet and Thomas Gerard Shannon It is certified that error appears in the above-identified patent and that said Letters Patent is hereby corrected as shown below:

<u>Column 25,</u>
Line 10, delete "-C(CH$_3$)CH$_2$CH$_2$-" and substitute -- -C(CH$_3$)$_2$CH$_2$CH$_2$- --.
Line 45, delete "amrhiphilic" and substitute -- amphiphilic --.
Line 47, delete "papernaking" and substitute -- papermaking --.

<u>Column 27,</u>
Line 57, delete "twherein" and substitute -- wherein --.

<u>Column 31,</u>
Line 18, delete "allyl" and substitute -- alkyl --.
Line 45, insert a new line and insert -- w≥1 --.

Signed and Sealed this

Nineteenth Day of November, 2002

Attest:

JAMES E. ROGAN
Attesting Officer     Director of the United States Patent and Trademark Office